United States Patent
Sample

(10) Patent No.: US 7,376,732 B2
(45) Date of Patent: May 20, 2008

(54) SYSTEMS AND METHODS FOR PREVENTING INTRUSION AT A WEB HOST

(75) Inventor: Char Sample, Ellicott City, MD (US)

(73) Assignee: Federal Network Systems, LLC, Arlington, VA (US)

( * ) Notice: Subject to any disclaimer, the term of this patent is extended or adjusted under 35 U.S.C. 154(b) by 153 days.

(21) Appl. No.: 10/290,834

(22) Filed: Nov. 8, 2002

(65) Prior Publication Data

US 2004/0093407 A1    May 13, 2004

(51) Int. Cl.
*G06F 15/173* (2006.01)
(52) U.S. Cl. .................. 709/224; 709/203; 709/217
(58) Field of Classification Search ............. 709/219, 709/224, 228, 223, 225–229, 203, 217; 713/201
See application file for complete search history.

(56) References Cited

U.S. PATENT DOCUMENTS

| | | | |
|---|---|---|---|
| 5,774,668 A | | 6/1998 | Choquier et al. |
| 5,852,717 A | * | 12/1998 | Bhide et al. ................ 709/203 |
| 5,864,683 A | * | 1/1999 | Boebert et al. ............ 709/249 |
| 5,991,795 A | * | 11/1999 | Howard et al. ............ 709/201 |
| 6,106,575 A | | 8/2000 | Hardwick |
| 6,202,070 B1 | * | 3/2001 | Nguyen et al. ........... 707/104.1 |
| 6,222,856 B1 | * | 4/2001 | Krishnan et al. ........... 370/468 |
| 6,356,863 B1 | | 3/2002 | Sayle |
| 6,389,129 B1 | * | 5/2002 | Cowan ....................... 709/220 |
| 6,466,980 B1 | | 10/2002 | Lumelsky et al. |
| 6,557,035 B1 | | 4/2003 | McKnight |
| 6,564,243 B1 | * | 5/2003 | Yedidia et al. .............. 709/203 |
| 6,622,226 B1 | | 9/2003 | Dussud |
| 6,654,745 B2 | * | 11/2003 | Feldman ..................... 709/219 |
| 6,681,232 B1 | | 1/2004 | Sistanizadeh et al. |
| 6,760,747 B2 | * | 7/2004 | Allard et al. ............... 709/203 |
| 6,782,398 B1 | * | 8/2004 | Bahl ........................... 709/202 |
| 6,804,673 B2 | * | 10/2004 | Levi et al. .................. 709/203 |
| 6,832,256 B1 | * | 12/2004 | Toga .......................... 709/229 |
| 7,039,673 B1 | * | 5/2006 | Abbott et al. .............. 709/203 |
| 7,124,403 B2 | | 10/2006 | Price et al. |
| 2001/0044840 A1 | | 11/2001 | Carleton |
| 2002/0046264 A1 | * | 4/2002 | Dilon et al. ................ 709/219 |
| 2002/0065911 A1 | * | 5/2002 | von Klopp et al. ......... 709/224 |
| 2002/0066034 A1 | * | 5/2002 | Schlossberg et al. ....... 713/201 |
| 2002/0101819 A1 | | 8/2002 | Goldstone |
| 2002/0103916 A1 | | 8/2002 | Chen et al. |
| 2002/0108060 A1 | * | 8/2002 | Takamoto et al. .......... 709/217 |
| 2002/0129088 A1 | * | 9/2002 | Zhou et al. ................ 709/200 |
| 2002/0133603 A1 | * | 9/2002 | Mitomo et al. ............. 709/229 |
| 2002/0157020 A1 | * | 10/2002 | Royer ........................ 713/201 |
| 2002/0161868 A1 | | 10/2002 | Paul et al. |

(Continued)

OTHER PUBLICATIONS

Carleton University, "Managing your Unix Disk Quota", http://mathstat.carleton.ca/-help/quota.html, Aug. 22, 2002.

(Continued)

*Primary Examiner*—Phuoc H. Nguyen

(57) ABSTRACT

A web host intrusion prevention system includes a filter engine 302 and comparison tables 303. The comparison tables 303 are populated with the set of valid commands that are to be received at a server. The filter engine 302 looks up received commands in the comparison tables 303. Received commands that are not in the comparison table are rejected.

27 Claims, 7 Drawing Sheets

U.S. PATENT DOCUMENTS

| | | |
|---|---|---|
| 2002/0161891 A1 | 10/2002 | Higuchi et al. |
| 2002/0161913 A1 | 10/2002 | Gonzalez et al. |
| 2002/0166046 A1 | 11/2002 | Bidarhalli et al. |
| 2002/0184363 A1 | 12/2002 | Vianvant et al. |
| 2002/0194340 A1 | 12/2002 | Ebstyne et al. |
| 2002/0194490 A1 | 12/2002 | Halperin et al. |
| 2003/0023873 A1* | 1/2003 | Ben-Itzhak .................. 713/201 |
| 2003/0028642 A1 | 2/2003 | Agarwal et al. |
| 2003/0028803 A1* | 2/2003 | Bunker et al. .............. 713/201 |
| 2003/0051142 A1* | 3/2003 | Hidalgo et al. ............. 713/176 |
| 2003/0056116 A1* | 3/2003 | Bunker et al. .............. 713/201 |
| 2003/0115244 A1 | 6/2003 | Molloy et al. |
| 2003/0154284 A1 | 8/2003 | Bernardin et al. |
| 2003/0154399 A1* | 8/2003 | Zuk et al. ................... 713/201 |
| 2003/0158940 A1 | 8/2003 | Leigh |
| 2004/0003290 A1* | 1/2004 | Malcolm .................... 713/201 |
| 2004/0044771 A1 | 3/2004 | Allred et al. |
| 2004/0054791 A1* | 3/2004 | Chakraborty et al. ....... 709/229 |
| 2004/0088571 A1* | 5/2004 | Jerrim et al. ............... 713/201 |

OTHER PUBLICATIONS

Estan, Cristian et al., "New Directions in Traffic Measurement and Accounting", 2001 ACM IMW'02, pp. 75-80.

Giuffrida, Mark et al., "Novell Netware Evaluation", http://www.ifs.umich.edu/~ifs/RD/NetWare/netware-eval.html, Mar. 1994.

Kargl, Frank et al., "Protecting Web Servers From Distributed Denial of Sservice Attacks", Mar. 2001 WWW10, pp.514-524.

Packeteer, "PacketShaper 4000 Getting Started Version 4.0", Mar. 1999.

Stephenson, Peter, "Investigation Computer Crime", 2000 CRC Press LLC, http://www.infosecuritynetbase.com, Appendix A and Chapter 4.

Person, Ron et al., "Chapter 22, Working with Disks and Disk Drives", 1997, http://safariexamples.infomit.com/0789713993/books/win95/ch22.htm.

Cook, Dave, "Understanding Windows 2000 Disk Quotas", Oct. 2001, PC Network Advisor.

TCU, "Windows 2000-Transitions", Summer 2001.

Symantec, "Norton AntiVirus Corporate Edition Implementation Guide", 2000 Symantec Corporation, pp. i-iii, 17-21, 23-26, 181-214.

* cited by examiner

SYSTEMS AND METHODS FOR PREVENTING INTRUSION AT A WEB HOST

RELATED APPLICATIONS

This application is related to the concurrently-filed application, Ser. No. 10/290,961, titled "Server Resource Management, Analysis, and Intrusion Negation."

BACKGROUND OF THE INVENTION

A. Field of the Invention

The present invention relates generally to network application servers, and more particularly, to security software used to protect network servers.

B. Description of Related Art

Network servers, such as computers that transmit HTML (HyperText Markup Language) documents to client computing devices on the Internet, may interact and receive data requests from many different end-users. These servers, which may receive and respond to the end-user requests, are commonly called web servers.

At a basic level, web servers provide static web pages to end-users by forwarding requested files to the end-users. At a more advanced level, web servers may respond to user input and generate dynamic web pages for the user based on the user input. Common Gateway Interface (CGI) is a standard protocol through which a web server passes a user's request to an application program. The application processes the user's request and transmits information to the web server for forwarding back to the user.

Web servers are frequently targets for attacks from malicious end-users. The end-user may wish to disable the web-server, to gain control of the web server, or to access information on the web server that would not normally be accessible to the end-user. One type of attack involves sending long requests or a large number of requests to the web server in an attempt to cause a web server error, such as a buffer overflow condition. Such web server error conditions may compromise the security of the web server.

Accordingly, there is a need in the art for increasing the reliability of web servers and their resistance to malicious attacks.

SUMMARY OF THE INVENTION

Systems and methods consistent with the principles of this invention provide for a web host intrusion prevention system (WHIPS) that protects a network application server, such as a web server, from malicious attacks and/or resource overload.

One aspect of the invention is directed to a method including intercepting commands directed for a web server, comparing the intercepted commands to a pre-designated set of commands that are known to be valid commands for the web server, and dropping the intercepted commands when the comparison of the intercepted commands does not generate a match to the pre-designated set of commands.

A second aspect of the invention is directed to a computing device that includes a communication interface component that receives network traffic destined for the computing device. The computing device additionally includes comparison tables that store sets of commands and web serving software that receives the network traffic from the communication interface and responds to commands in the network traffic. Further, a filter engine performs lookups in the comparison tables based on the commands present in the received network traffic. The filter engine additionally instructs the communication interface to refrain from forwarding the network traffic to the web server software when one of received commands in the network traffic does not correspond to a command in the set of commands.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents of the claim features.

As described below, a web host intrusion prevention system (WHIPS) includes comparison tables and a filter engine. The comparison tables list approved requests that users may make. The filter engine screens incoming requests from users using the comparison tables. Non-approved requests are blocked and are not received by the web server software. Accordingly, users attempting to attack the web server using techniques, such as a buffer overrun attack, will be blocked by the filter engine.

System Overview

Figure 1:
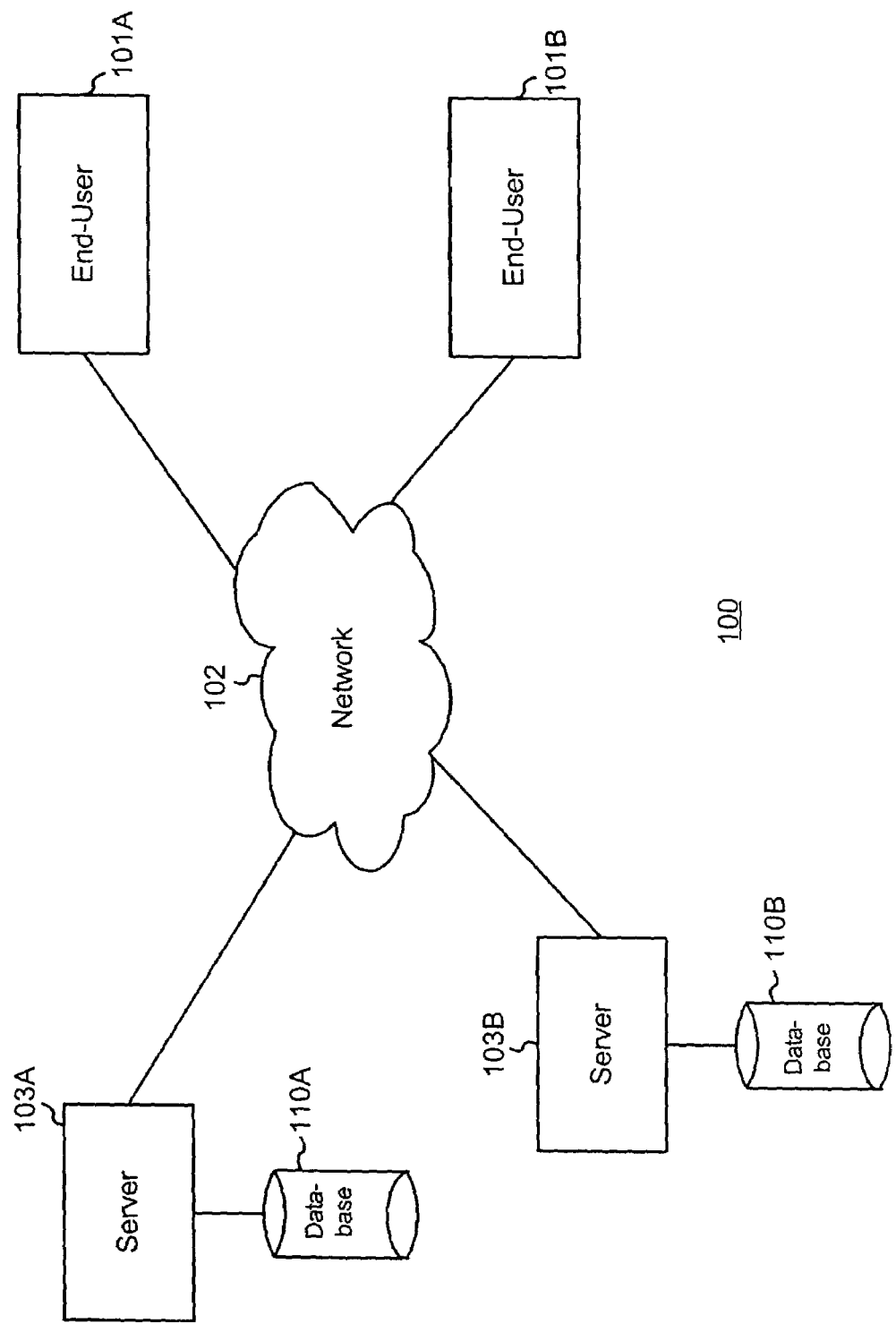
FIG. 1 is a diagram illustrating an exemplary system in which concepts consistent with the invention may be implemented.

FIG. 1 is a diagram illustrating an exemplary system 100 in which concepts consistent with the present invention may be implemented. System 100 may include a number of end-user computing devices 101A and 101B, a network 102, and web servers 103A and 103B (end-user computing devices 101 and 101B and web servers 103A and 103B are collectively referred to as end-user computing devices 101 and web servers 103, respectively). End-user computing devices 101 may include personal computers through which users connect to network 102. Network 102 may include any type of network, such as a local area network (LAN), a wide area network (WAN), a virtual private network (VPN), an intranet, the Internet, or a combination of networks. End-user computing devices 101 and web servers 103 may connect to network 102 via wired, wireless, and/or optical connections.

Web servers 103 may respond to requests for information from end-user computing devices 101. For example, web server 103A may be an HTML server that interacts with end-user computing device 101 A through hyper-text transfer protocol (HTTP) sessions to transmit HTML web pages to the users. A database 110A may be coupled to web server 103A. Web server 103A may access database 110A when fulfilling the user HTML requests.

Figure 2:
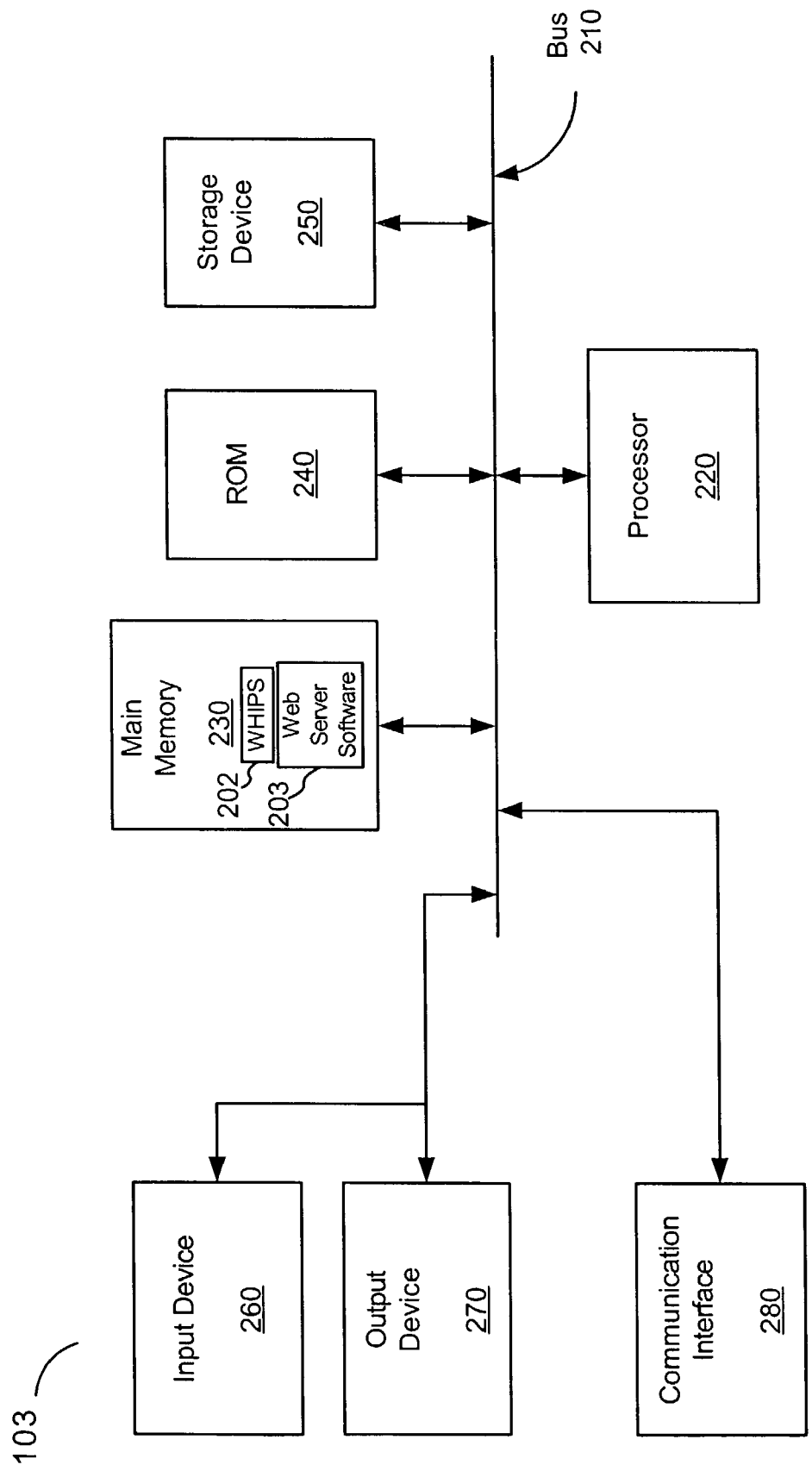
FIG. 2 is a diagram of an exemplary computing device that may correspond to one of the servers in FIG. 1.

FIG. 2 is a diagram of an exemplary computing device that may correspond to one of web servers 103. Server 103 may include bus 210, processor 220, main memory 230, read only memory (ROM) 240, storage device 250, input device 260, output device 270, and communication interface 280. Bus 210 permits communication among the components of server 103.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive. Storage device 250 may include a database, such as database 110 (FIG. 1). Alternatively, database 110 may be implemented on an alternate storage device 250, such as a remote storage device, or in main memory 230.

Input device 260 may include one or more conventional mechanisms that permit an operator to input information to web server 103, such as a keyboard, a mouse, a pen, a number pad, a microphone and/or biometric mechanisms, etc. Output device 270 may include one or more conventional mechanisms that output information to the operator, including a display, a printer, speakers, etc. Communication interface 280 may include any transceiver-like mechanism that enables web server 103 to communicate with other devices and/or systems. For example, communication interface 280 may include mechanisms for communicating with another device or system via a network, such as network 102.

In one implementation, main memory 230 may include computer programming instructions that implement a web host intrusion prevention system (WHIPS) 202 consistent with aspects of the invention. WHIPS 202 may interact with traditional web server software, such as web server software 203. Web server software 203 may be any of a number of conventional web server programs, such as the open-source Apache web server or the Internet Information Server (IIS) web server, available from Microsoft Corporation, of Redmond, Wash.

Whips

Figure 3:
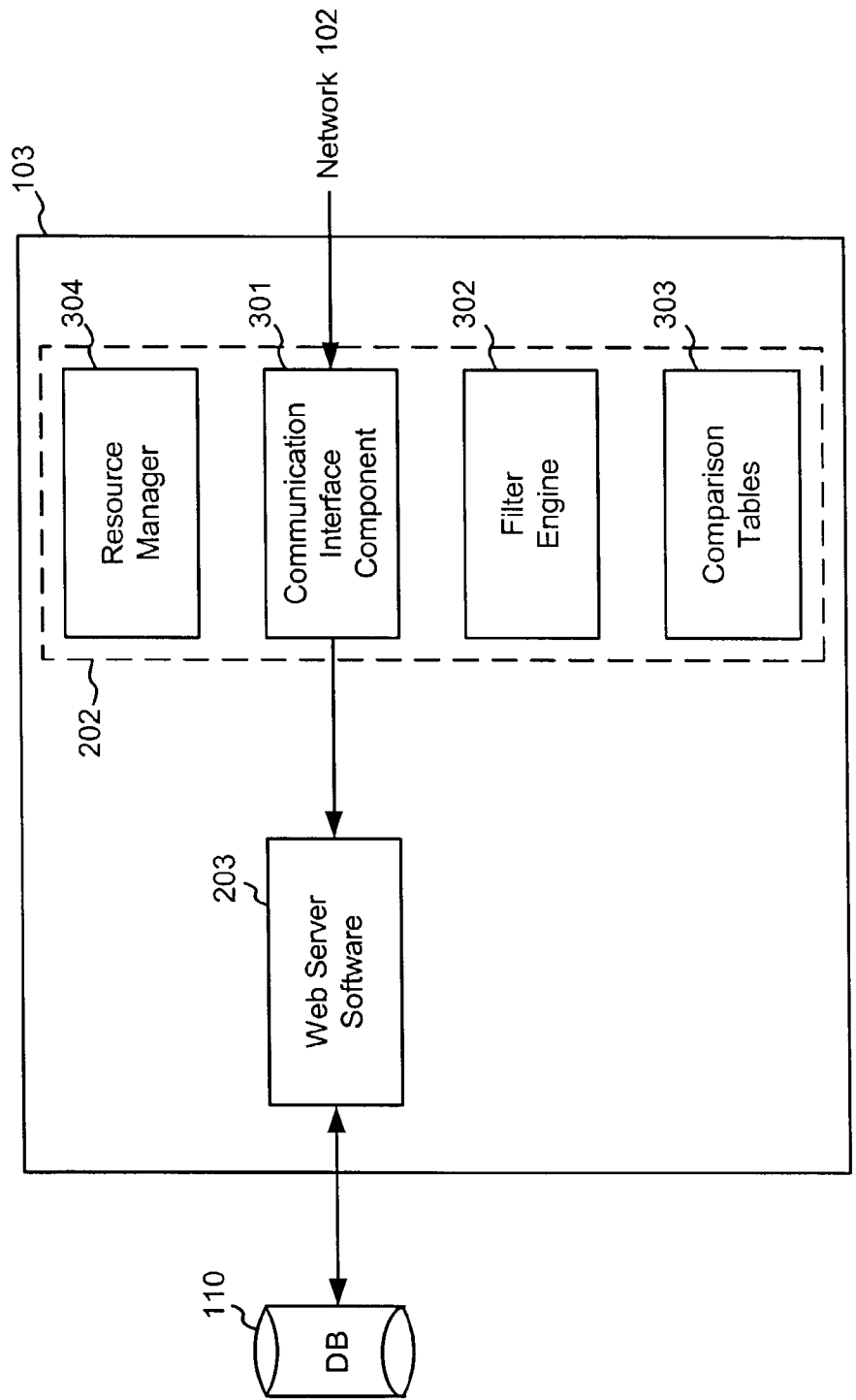
FIG. 3 is a diagram conceptually illustrating the interaction of software components running on the servers shown in FIGS. 1 and 2.

FIG. 3 is a diagram conceptually illustrating the interaction of software components, including WHIPS 202, running on server 103. WHIPS 202 may include communication interface component 301, a filter engine 302, comparison tables 303, and a resource manager 304.

Communication interface component 301 intercepts inbound traffic from network 102 to web server 103 and forwards the traffic to filter engine 302. Communication interface component 301 may be implemented via several possible mechanisms. In one implementation, based on the transmission control protocol (TCP) wrapper software, communication interface component 301 would act as a proxy for web server software 203. In another possible implementation, communication interface component 301 may reside at the network software level and web server software 203 is bound to a specific port. Communication interface component 301 may then intercept traffic at the network level and pass the traffic to the port. Another possible way to implement communication interface component 301 is through the use of a virtual device. Web server software 203 may bind to the virtual device while communication interface component 301 may bind to the actual network socket (e.g., communication interface 280). Communication interface component 301 could then receive network traffic at the actual socket and forward the traffic to web server software 203. One of ordinary skill in the art will recognize that many different techniques can be used to implement communication interface component 301, and that the optimal technique to use may depend on a number of situation specific factors, such as the particular hardware and software environment of WHIPS 202 and web server software 203.

Filter engine 302 compares commands received by communication interface 301 to a list of valid commands stored in comparison tables 303. If, based on the comparison, filter engine 302 determines that a command is not valid, communication interface 301 may not pass the command to web server 203. By screening incoming commands, filter engine 302 eliminates malicious commands that are being transmitted to web server software 203 with the intention of de-stabilizing or corrupting server 103.

Resource manager 304 monitors resources of server 103. When the resources of server 103 are constrained, resource manager 304 may throttle back resource usage of server 103. By ensuring that the resources of web server 103 are not overloaded, resource manager increases the stability of web server 103.

Filter engine 302, comparison tables 303, and resource manager 304 are described in more detail below.

Filter Engine and Comparison Tables

Figure 4:
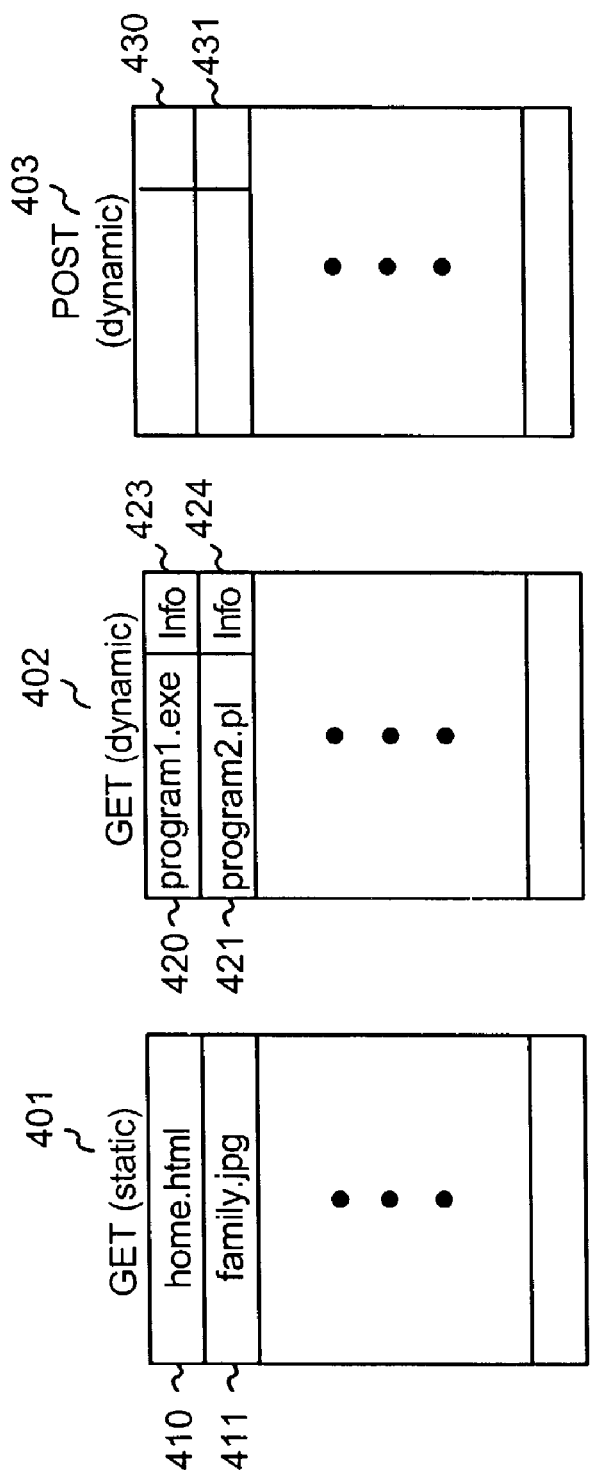
FIG. 4 is a diagram illustrating an exemplary implementation of comparison tables consistent with an aspect of the invention.

FIG. 4 is a diagram illustrating an exemplary implementation of comparison tables 303 consistent with an aspect of the invention. In general, comparison tables 303 include group of tables that associate commands, such as HTTP methods, with acceptable parameters for the commands. The acceptable parameters for the commands are determined by the resources that server 103 intends to make available to end-user computing devices 101.

As shown in FIG. 4, comparison tables 303 may include a GET table (static) 401, a GET table (dynamic) 402, and a POST table 403.

The GET command is used by end-users to retrieve resources from server 103. A simple static GET command, for example, may take the form of: GET <URI>, where URI is a uniform resource identifier that identifies the resource that is to be retrieved. The URI, may, for example, refer to a document (e.g., an HTML page), a picture, or an audio file on server 103.

A resource referenced by the URI of the GET command may not be a static resource. Instead, the URI may refer to data that is dynamically generated by the server. For example, the URI may refer to a script file that the receiving server executes to generate data that may depend on one or more variables. For example, a GET command may reference a script that returns the latest weather forecast by causing the server to lookup the latest weather forecast before returning it to the user.

Table 401 may include all valid static GET commands for server 103. For example, server 103 may include an HTML file, "home.html" 410 and a picture file "family.jpg" 411, that server 103 wishes to make available to end-user computing devices 101. Although only two entries are specifically shown in table 401, in practice, a table such as table 401 may contain many more than two entries.

Table 402 may include entries for GET commands that reference dynamic entries, such as GET commands that initiate the execution of scripts. The scripts may comply with the Common Gateway Interface (CGI) standard that provides for the creation of interactive web sites. Two scripts, scripts 420 and 421, are shown in table 402. Consistent with an aspect of the invention, table 402 may include information in addition to the name of the script. Table 402 may, for example, additionally store information 423 and 424 that characterizes the nature of the script referenced by the file name and the expected input parameters of the script. For example, a Perl script 421 that processes user information such as the user name should constrain the name size (e.g., 50 characters or less). Accordingly, the information 424 for the Perl script 421 in table 402 may additionally indicate whether the Perl script appropriately constrains the name size.

WHIPS 202 may maintain tables for other commands in addition to the GET command. The HTTP POST command, for example, allows a user to transmit data for processing by server 103. POST commands are typically dynamic commands that reference scripts for processing the user's data. Table 403 may store entries, such as entries 430 and 431, associated with POST commands. The entries for the POST commands are structured similarly to the entries in dynamic GET table 402.

To ensure efficient access for tables 401–403, these tables may be sorted and/or organized into a tree structure. Additionally, a cache area may be established in server 103 that stores that most frequently accessed entries in tables 401–403 for quick access by the server. Although not shown, other tables, such as tables for the HTTP PUT command, may also be included in comparison tables 303.

Figure 5:
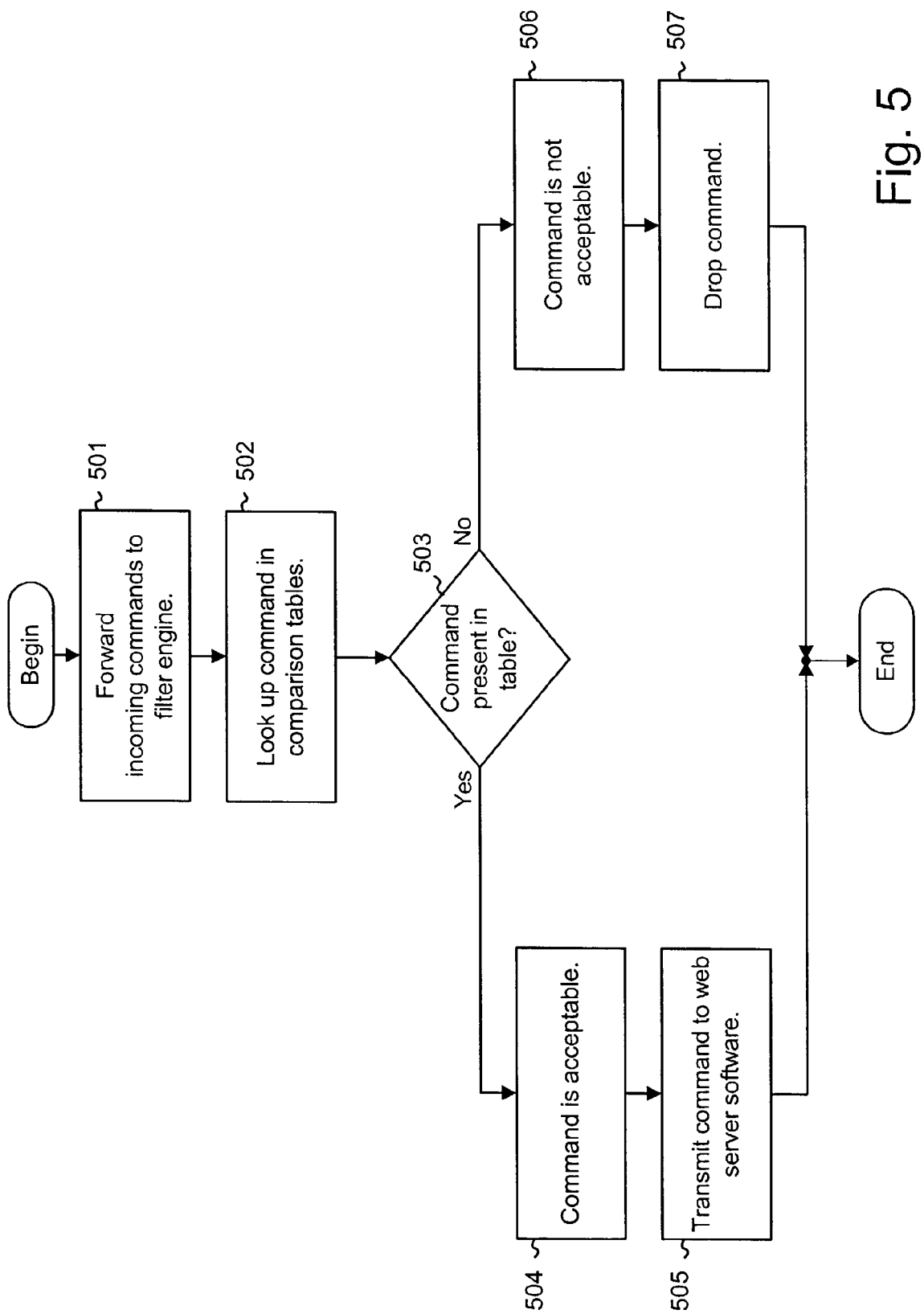
FIG. 5 is a flow chart illustrating the interaction of the communication interface component, the filter engine, and the comparison tables shown in FIG. 3.

FIG. 5 is a flow chart illustrating the interaction of communication interface component 301, filter engine 302, and comparison tables 303 consistent with an aspect of the invention. Communication interface component 301 forwards incoming commands received from end-user computing devices 101 to filter engine 302 (Act 501). Filter engine 302 looks-up the commands in comparison tables 303 (Act 502). For example, if the received command is a static GET command, filter engine 302 may compare the resource referenced in the GET command to the entries in table 401. When the command is present in comparison tables 303, filter engine 302 signals communication interface component 301 that the command is acceptable (Acts 503 and 504). Communication interface component 301 may then transmit the command to web server software 203 for processing (Act 505). When, however, the command is not present, or does not conform to the format dictated by comparison tables 303, filter engine 302 transmits a signal to communication interface component 301 indicating that the command is not acceptable (Acts 503 and 506). In this situation, the command does not reference a valid resource on web server 103, and therefore, may be a malicious or de-stabilizing command. Accordingly, communication interface component 301 may drop and optionally log the command (Act 507).

Web server 103 may return a "request not found" error to the user that transmitted the bad command.

Before using comparison tables 303 to determine if received commands are valid, WHIPS 202 initially constructs the comparison tables. WHIPS 202 may construct the comparison tables before web server software 203 is deployed. Comparison tables 303 may be incrementally updated as administrators modify the content that is to be supplied by web server software 203.

In constructing comparison tables 303, WHIPS 202 examines all files that define content or that generate content for web server software 203. Generally, web serving programs store these types of files in a file directory structure beginning at a web root directory. Accordingly, WHIPS 202 may recursively scan all directories under the web root directory to find web-related files. Static files may be used to fill static GET table 401. Scripts may be appropriately placed in dynamic GET table 402 and POST table 403. WHIPS 202 may examine scripts it locates to determine information, such as information 423 and 424, that characterizes the nature of the scripts including the nature of the input parameters expected end-users when they invoke the scripts.

Resource Manager

Resource manager 304 monitors resources of server 103 and may throttle back resource usage of server 103 when a resource becomes constrained. In this manner, resource manager 304 can work in conjunction with filter engine 302 to increase the stability of server 103.

Figure 6:
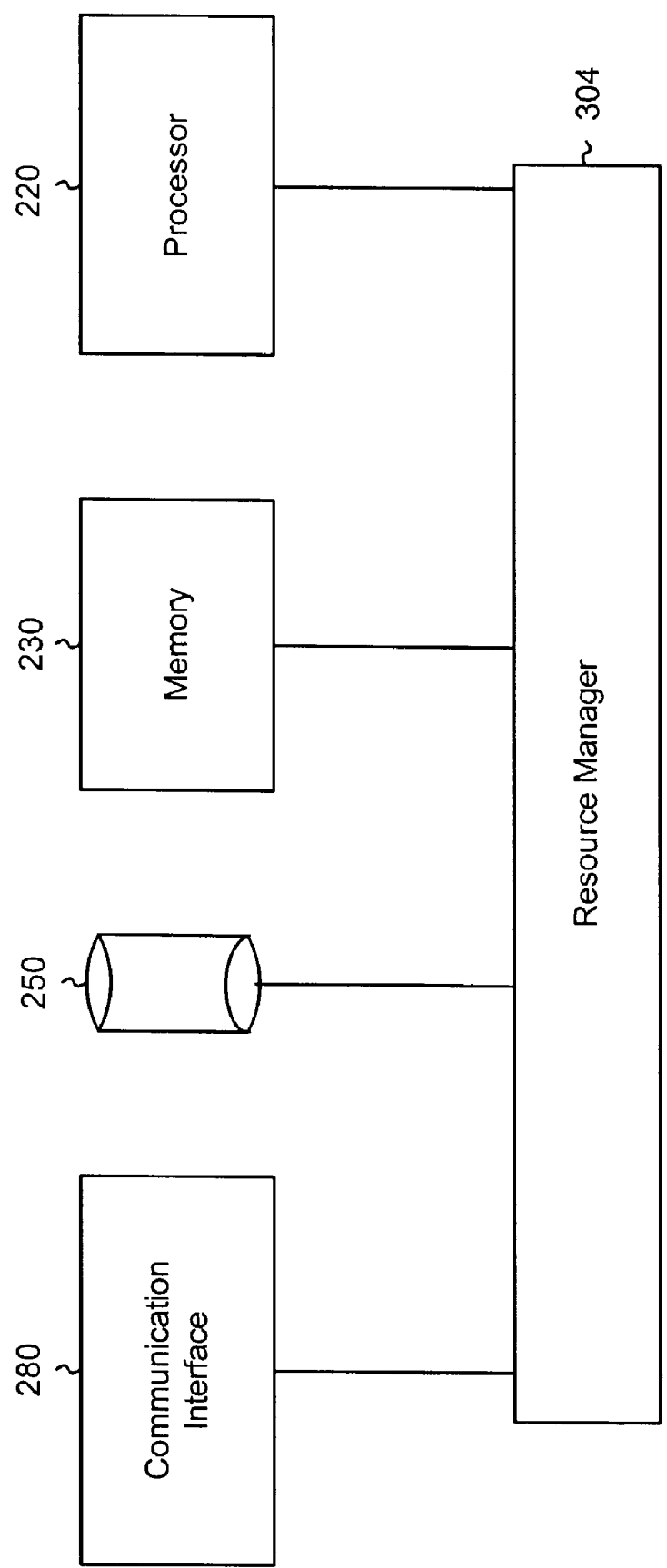
FIG. 6 is a diagram conceptually illustrating the interaction of the resource manager shown in FIG. 3 with a server.

FIG. 6 is a diagram conceptually illustrating the interaction of resource manager 304, running on a server 103, with elements associated with server 103. In particular, resource manager 304 may interact with communication interface 280 (and/or the software embedded by communication interface component 301), storage device 250, memory 230, and processor 220. In general, these elements of server 103 can be considered as resources of server 103. Resource manager 304 may monitor and control the activity level of these resources.

Figure 7:
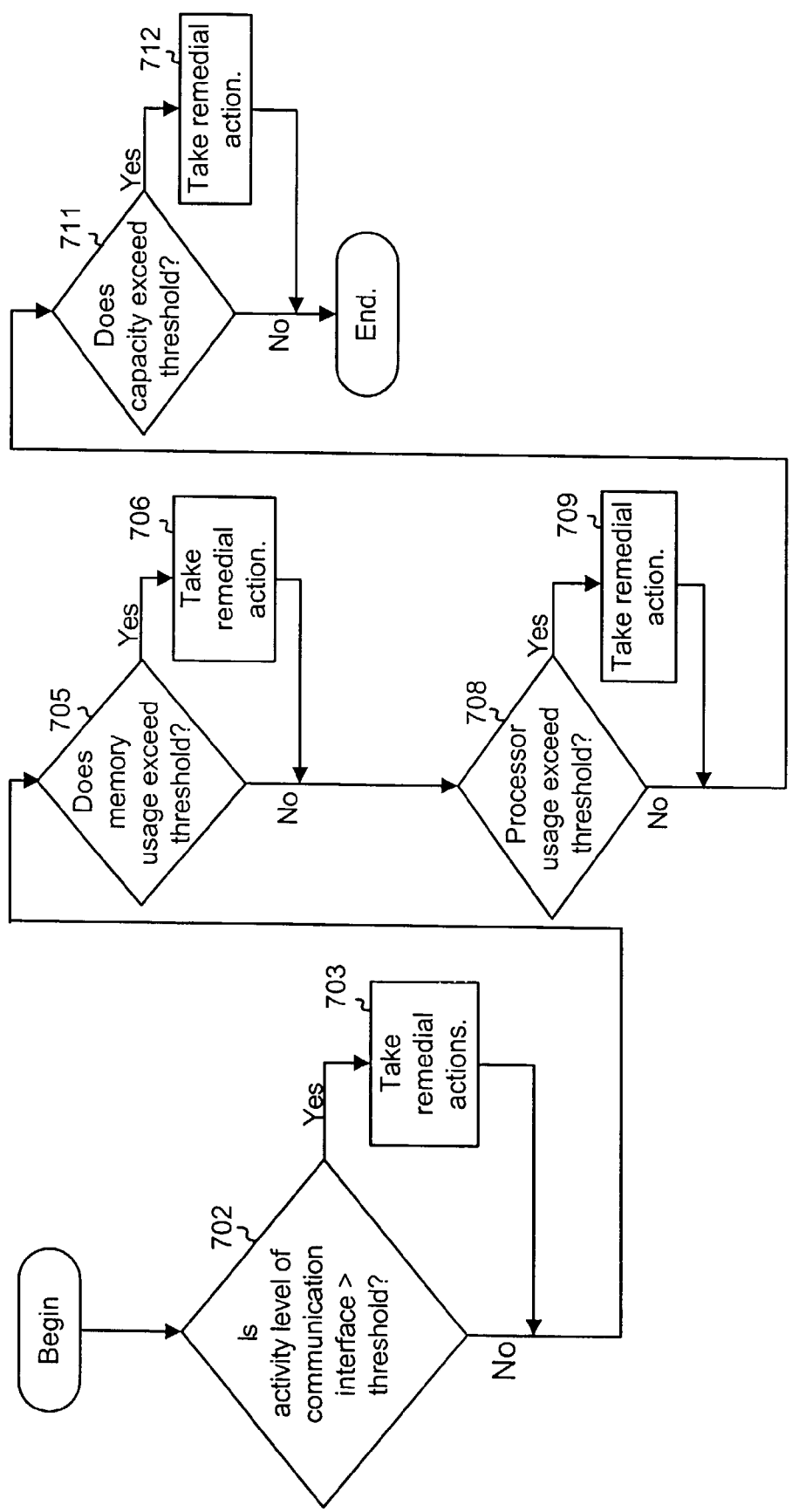
FIG. 7 is a flow chart illustrating operation of the resource manager consistent with an aspect of the invention.

FIG. 7 is a flow chart illustrating operation of resource manager 304 consistent with an aspect of the invention. Resource manager 304 may begin by checking an activity level of communication interface 280. This may include checking the number of open connections between server 103 and end-user computing devices 101. An end-user computing device 101 that wishes to receive information from server 103 begins by transmitting a request for a connection with server 103. Server 103, in turn, can accept or reject the connection. Additionally, server 103 may keep track of the number of open connections at any particular time.

Resource manager 304 maintains a threshold level relating to the activity level of communication interface 280. The threshold level may be set by an administrator locally at server 103 or from a remote computer over network 102. Resource manager 304 may check to determine whether the activity level at the communication interface 280 is above the threshold (Act 702). If it is, resource manager 304 may take remedial actions to effectively throttle back the number of active connections (Act 703). Such actions can include closing open connections. For example, resource manager 304 may first close connections that are open but inactive. If the number of connections is still too high, resource manager 304 may close connections that the server 103 classifies as lower priority connections. If the number of connections is still too high, resource manager 304 may begin to randomly close open connections. In addition, while the number of open connections is above the threshold, resource manager 304 may refuse any new connection requests from end-user computing devices 101.

In addition to checking an activity level of communication interface 280, resource manager 304 may check usage of memory 230. When memory capacity exceeds a predetermined threshold level (e.g., 95% of memory 230 is full), resource manager 304 may take memory-related remedial actions (Acts 705 and 706). These actions may include, for example, shutting down inactive processes (often referred to as zombie processes).

Resource manager 304 may also check processor usage. When the load on processor 220 is above a predetermined threshold (e.g., 90% of total processor capacity), resource manager 304 may take remedial actions (Acts 708 and 709). These actions may be similar to the actions taken in Act 706, and may include, for example, shutting down inactive processes or shutting down lower priority processes.

Resource manager 304 may also check the capacity of storage device 250, such as a hard disk drive(s). When storage device 250 has exceeded a predetermined threshold capacity (e.g., 95% of capacity), resource manager 304 may again take remedial action, (Act 711 and 712), such as redirecting future disk write commands to console (i.e., to a monitor) or compressing non-critical files such as log files.

Accordingly, as shown in the acts of FIG. 7, resource manager 304 operates to throttle back resource overload, and thus reduce the chances of server 103 crashing due to overload.

One of ordinary skill in the art will recognize that commands to check processor load, storage device load, and network connection load are well known, and are thus not described in detail herein.

CONCLUSION

WHIPS, as described above, includes a filter engine that examines incoming commands to ensure that web servers only process commands that access valid and authorized resources on the web server. Non-valid commands are blocked. WHIPS may additionally include a resource manager component that monitors resource usage at the server. The resource manager component may throttle back resources that are overburdened.

The foregoing description of preferred embodiments of the invention provides illustration and description, but is not intended to be exhaustive or to limit the invention to the precise form disclosed. Modifications and variations are possible in light of the above teachings or may be acquired from practice of the invention. Moreover, while a series of acts have been presented with respect to FIGS. 5 and 7, the order of the acts may be different in other implementations consistent with the present invention. Moreover, non-dependent acts may be performed in parallel.

Although WHIPS was primarily discussed herein as operating as a web server, WHIPS could, in other implementations, be adapted for use in other networked environments that include an application server.

Certain portions of the invention have been described as software that performs one or more functions. The software may more generally be implemented as any type of logic. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method for processing commands of at least one user, comprising:
    intercepting the commands directed for a web server to protect the server from malicious attack;
    establishing a pre-designated set of commands that are known to be valid commands for the web server;
    comparing the intercepted commands to the pre-designated set of commands that are known to be valid commands for the web server, the comparing always being made without reference to identity of said at least one user for each and every one of the intercepted commands;
    dropping ones of the intercepted commands to eliminate malicious commands when the comparison of the ones of the intercepted commands does not generate a match to the pre-designated set of commands, thereby not passing malicious intercepted commands to the web server;
    monitoring resources of the web server; and
    throttling back resource usage of the web server by the intercepted commands excluding the malicious intercepted commands when the monitored resources are being used above a threshold level.

2. The method of claim 1, further comprising:
    forwarding other ones of the intercepted commands to software of the web server when the comparison generates a match to the pre-designated set of commands.

3. The method of claim 1, wherein comparing the intercepted commands to the pre-designated set of commands includes looking up the intercepted commands without reference to identity of the user in a plurality of tables.

4. The method of claim 3, wherein the plurality of tables includes separate tables for storing commands relating to different hyper-text transfer protocol (HTTP) commands.

5. The method of claim 4, wherein the HTTP commands include GET and POST commands.

6. A computing device comprising:
    a communication interface component configured to receive network traffic destined for the computing device, the network traffic containing valid and/or malicious commands from at least one user;
    comparison tables configured to store at least one set of the valid at least one user commands;
    web server software configured to receive the network traffic from the communication interface and respond to the valid commands in the network traffic;
    a filter engine configured to perform lookups in the comparison tables based on the valid and/or malicious commands present in the received network traffic, the lookups always being performed without reference to identity of said at least one user for each and every one of the received network traffic commands, the filter engine instructing the communication interface to refrain from forwarding the network traffic to the web server software when one of the commands in the received network traffic commands does not correspond to a valid command in the at least one set of the valid commands, thereby protecting the server from malicious attack; and a resource manager configured to monitor resources of the computing device and throttle back resource usage of the computing device by the network traffic excluding the malicious commands when the monitored resources are being used above a threshold level.

7. The computing device of claim 6, wherein the comparison tables further include:

a plurality of tables, each of the plurality of tables dedicated to storing commands relating to a hyper-text transfer protocol (HTTP) command.

8. The computing device of claim 7, wherein the HTTP commands include GET and POST commands.

9. The computing device of claim 7, wherein at least one of the plurality of tables stores information relating to scripts called by the HTTP commands.

10. The computing device of claim 6, further comprising:

a database coupled to the web server software, the database containing information requested by the commands present in the network traffic.

11. The computing device of claim 6, wherein the monitored resources include at least one of processing capability, memory space, and network interface bandwidth.

12. A method for processing commands of at least one user, comprising:

examining files related to content information of a web server;

generating tables that define valid ones of the at least one user commands for accessing the examined files;

blocking received commands intended for the web server from reaching the web server to protect the server from malicious attack when the received commands are not present in the generated tables, the blocking always being implemented without reference to identity of said at least one user for each and every one of the received commands;

forwarding the received commands to software of the web server when the received commands are present in the generated tables;

monitoring resources of the web server; and throttling back resources usage of the web server by the received commands which are present in the generated tables when the monitored resources are being used above a threshold level.

13. The method of claim 12, wherein examining files related to content information of the web server includes recursively examining files in directories below a root directory of the web server.

14. The method of claim 12, wherein examining files related to content information of the web server includes updating examination of the files related to content for the web server when the files are modified.

15. The method of claim 12, wherein the examined files include static files.

16. The method of claim 12, wherein the examined files include scripts.

17. The method of claim 12, wherein the tables include separate tables for storing commands relating to different hyper-text transfer protocol (HTTP) commands.

18. The method of claim 17, wherein the HTTP commands include GET and POST commands.

19. A system comprising:

means for examining valid and/or malicious commands of at least one user destined for a web server, the examining always being conducted without reference to identity of said at least one user for each and every one of the commands;

means for establishing a pre-designated set of commands that are known to be valid commands for the web server;

means for comparing the examined commands to the pre-designated set of commands that are known to be valid commands for the web server to provide a basis for eliminating malicious commands;

means for dropping ones of the examined commands when the means for comparing the commands does not generate a match between the ones of the examined commands and the pre-designated set of commands, thereby not passing the ones of the examined commands to the web server to protect the server from malicious attack;

means for monitoring resources of the web server; and means for throttling back resource usage of the web server by the valid examined commands when the monitored resources are being used above a threshold level.

20. The system of claim 19, further comprising:

means for forwarding other ones of the commands to software of the web server when the means for comparing generates a match to the pre-designated set of commands.

21. The system of claim 19, further comprising:

means for generating tables that store the pre-designated set of commands without reference to identity said at least one user.

22. The system of claim 21, wherein the tables include separate tables for storing commands relating to different hyper-text transfer protocol (HTTP) commands.

23. A computer-readable medium containing instructions that when executed by a processor cause the processor to:

intercept commands of at least one user directed to a web server to protect the server from malicious attack;

establish a pre-designated set of commands that are known to be valid commands for the web server;

compare the intercepted commands to the pre-designated set of commands that are known to be valid commands for the web server, the comparison always being made without reference to identity of said at least one user for each and every one of the intercepted commands;

drop ones of the intercepted commands to eliminate malicious commands when the comparison of the ones of the intercepted commands does not generate a match to the pre-designated set of commands and thereby not pass malicious intercepted commands to the web server;

monitor resources of the web server; and throttle back resource usage of the web server by the intercepted commands excluding the malicious intercepted commands when the monitored resources are being used above a threshold level.

24. The computer-readable medium of claim 23, wherein the instructions further cause the processor to:

forward other ones of the intercepted commands to software of the web server when the comparison generates a match to the pre-designated set of commands.

25. The computer-readable medium of claim 23, wherein comparing the intercepted commands to the pre-designated set of commands includes looking up the intercepted commands in a plurality of tables without reference to identity of said at least one user.

26. In a client server network wherein at least one client forwards commands to said server to obtain responses from said server to said commands, a system for protecting said server against malicious attack by certain of said commands, said system comprising:

means for receiving said commands including said certain of said commands;

means for establishing a pre-designated set of commands which are known to be valid commands for said server;

means for comparing each one of said commands including each one of said certain of said commands against said pre-designated set of commands, operation of said comparing means being performed for each and every one of said commands always without reference to identity of said client;

means for eliminating malicious commands by dropping any command from said commands including said certain commands, which does not match a command contained in said pre-designated set of commands, thereby providing dropped commands;

means for forwarding all commands other than said dropped commands to software of said server for said responses allowing the server to be protected from said malicious attack; and means for monitoring resources of the web server and throttling back resource usage of the web server by the intercepted commands excluding the malicious intercepted commands when the monitored resources are being used above a threshold level.

27. In a client server network wherein at least one client forwards commands to said server to obtain responses from said server to said commands, a method for protecting said server against malicious attack by certain of said commands, said method comprising:

receiving said commands including said certain of said commands;

establishing a pre-designated set of commands which are known to be valid commands for said server;

comparing each one of said commands including each one of said certain of said commands against said pre-designated set of commands, said comparing being performed for each and every one of said commands always without reference to identity of said client;

eliminating malicious commands by dropping any command from said commands including said certain commands, which does not match a command contained in said pre-designated set of commands, thereby providing dropped commands;

forwarding all commands other than said dropped commands to software of said server for said responses allowing the server to be protected from said malicious attack; and monitoring resources of the web server and throttling back resource usage of the web server by the intercepted commands excluding the malicious intercepted commands when the monitored resources are being used above a threshold level.

* * * * *